United States Patent [19]

Nielsen, Jr. et al.

[11] Patent Number: 4,497,083
[45] Date of Patent: Feb. 5, 1985

[54] HEATED WINDSHIELD WIPER

[76] Inventors: Edward M. Nielsen, Jr., P.O. Box 992; Walter T. Caffrey, 2170 23rd Ave., both of Columbus, Nebr. 68601

[21] Appl. No.: 532,061

[22] Filed: Sep. 14, 1983

[51] Int. Cl.³ .............................................. B60S 1/04
[52] U.S. Cl. .............................................. 15/250.06
[58] Field of Search ................... 15/250.05–250.09

[56]         References Cited
        U.S. PATENT DOCUMENTS

| | | | |
|---|---|---|---|
| 2,686,247 | 8/1954 | Curless, Jr. | 15/250.06 |
| 3,034,166 | 5/1962 | Bell | 15/250.07 |
| 3,408,678 | 11/1968 | Linker | 15/250.05 |
| 3,409,930 | 11/1968 | Linker | 15/250.06 |
| 3,419,932 | 1/1969 | Linker | 15/250.06 |
| 3,428,993 | 2/1969 | Rickett | 15/250.06 |
| 4,360,941 | 11/1982 | Mabie | 15/250.07 |

Primary Examiner—Peter Feldman
Attorney, Agent, or Firm—Harvey B. Jacobson; Clarence A. O'Brien

[57] ABSTRACT

A heated windshield wiper has resistance wiring running along the length of the wiper arm, the blade carrier, and the wiper blade for heating the blade and carrier when connected into a vehicle electrical system. Wiring connections are provided between the blade and the carrier allowing blades to be replaced independently of the arm and carrier.

6 Claims, 5 Drawing Figures

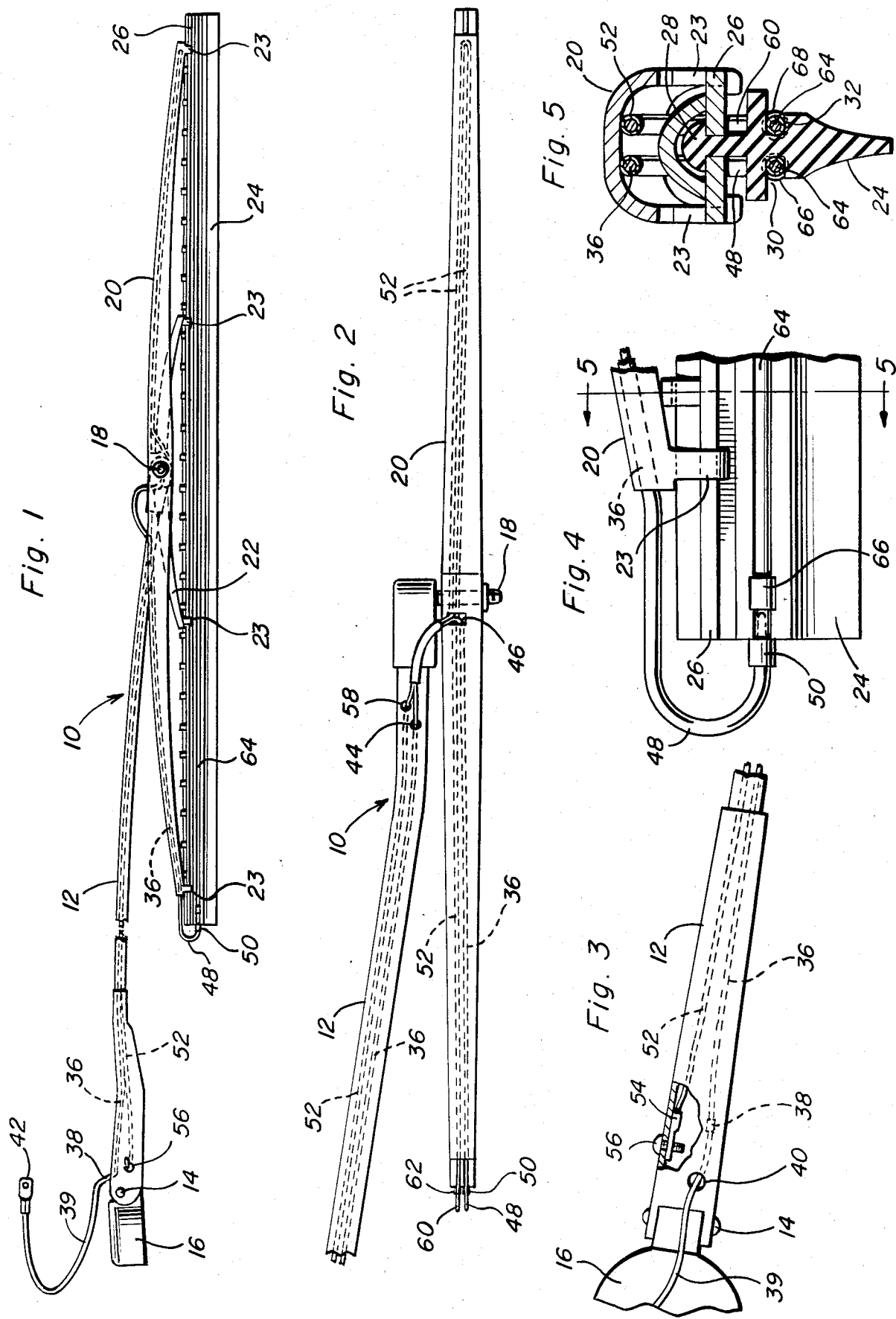

HEATED WINDSHIELD WIPER

BACKGROUND OF THE INVENTION

This invention relates to a windshield wiper structure incorporating resistance wiring for connection into the electrical system of a vehicle, so as to provide a heated wiper useful, for example, for reducing or eliminating ice, slush, snow or like buildups on the wiper arm and blade in times of inclement weather, thereby improving wiper efficiency and enhancing vehicle safety.

While primarily intended for automotive use, the invention is also applicable to aircraft, boats, railroad locomotives, and other vehicles using windshield wipers.

STATEMENT OF PRIOR ART

Acknowledgement is made of the following U.S. patents pertaining to windshield wiper structures: U.S. Pat. Nos. 1,510,015, 1,980,254, 2,733,472, 3,195,161, 3,249,959, 3,372,421, 3,718,940.

SUMMARY OF THE INVENTION

In accordance with the inventionm, a heated windshield wiper structure has resistance wiring along the length of the wiper arm, the blade carrier and the wiper blade for heating these components when the wiring is connected into a vehicle electrical system. Wiring connections are preferably provided between the blade and the carrier allowing blades to be replaced independently of the arm and carrier.

In a preferred form of the invention, for example, the resistance wiring is in the form of a wiring loop having a first wire extending along the length of the wiper arm, entering the blade carrier substantially centrally thereof, and extending to one end of the blade carrier, a second wire extending along the length of the wiper arm, entering the blade carrier substantially centrally thereof extending to the opposite end of the blade carrier and then back to said one end of the blade carrier, and a third wire looped lengthwise around the wiper blade, and having connector elements at one end of the blade for connection to complementary connector elements on the first and second wires extending from an adjacent end of the blade carrier. Thus, when connected into a vehicle electrical system, the arm, carrier and blade are electrically heated to reduce or eliminate icing and like problems, thereby effectively increasing wiper blade efficiency. Further, the arrangement allows either the entire wiper structure comprising the wiper arm, blade carrier, and blade to be removed from the vehicle and replaced, by disconnecting the resistance wiring from the vehicle electrical system, or alternatively it allows only the blade to be removed and replaced by disconnecting the aforementioned connector elements.

The invention accordingly provides a convenient form of heated windshield wiper structure incorporating resistance wiring for heating the structure when connected into a vehicle electrical system, and wherein connections are provided in the wiring at critical locations to facilitate replacement of selected parts of the structure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is an elevational view of a windshield wiper structure in accordance with the invention.

FIG. 2 is a plan view of a front part of the wiper structure to an enlarged scale.

FIG. 3 is a plan view of a rear part of the structure.

FIG. 4 is a detailed elevational view of a part of the wiper to a more enlarged scale.

FIG. 5 is a sectional view on line 5—5 of FIG. 4 to an even more enlarged scale.

DESCRIPTION OF PREFERRED EMBODIMENT

The illustrated wiper structure 10 comprises a conventional form of wiper arm 12 having a pivot connection 14 at one end with a head fitting 16 adapted to fit on a vehicle wiper terminal, and a swivel connection 18 at the other end with an elongate wiper blade carrier 20. Carrier 20 incorporates a bowed clip 22 in known manner, the clip and carrier having bent-over tabs 23 which secure a resilient wiper blade 24 and blade-reinforcement plate 26 to the carrier, also in known manner. The profile of blade 24 as shown in FIG. 5 is conventional, and includes an upper bead 28 whereby the blade is retained in plate 26, and opposed longitudinally extending grooves 30, 32.

In accordance with the invention, the wiper structure is provided with resistance wiring in the form of a wiring loop, the wiring for example comprising high temperature insulated 25 gauge (0.0179" diameter) resistance wire (having a resistance of 0.94 ohm/ft.) extending along the length of arm 12 from adjacent pivot connection 14, through the length of blade carrier 20, and along the length of blade 24 as will be described. The resistance wiring is adapted to be supplied with electrical energy from a vehicle electrical system, so as to heat the arm, the carrier and the blade for the purpose of melting ice, snow, slush or the like in inclement weather, thereby increasing the efficiency of the wiper blade.

The wiring loop includes a first wire 36 having one end silver soldered internally of arm 12, at 38, to a braided copper wire 39 which extends from the wiper arm through an opening 40 adjacent pivot connection 14 and terminates in a spade connector 42 for connection into a vehicle electrical system. Wire 36 extends down the length of arm 12, exits through an opening 44 adjacent the distal end of the arm, enters carrier 20 through a central opening 46, extends from opening 46 down the length of the left-hand portion of the carrier (see FIG. 2), exits at the left end of the carrier, and terminates in a free end portion 48 having the male part 50 of a miniature gold-plated connector silver soldered to its end.

The wiring loop further includes a second wire 52 having a connector 54 soldered to one end which is attached by a screw 56 to the interior of arm 12 adjacent pivot connection 14 to form a ground connection for the resistance wiring. Wire 52 extends from connector 54 down the length of arm 12, exits through an opening 58, enters carrier 20 through opening 46, extends as an elongate loop along the length of the right-hand portion of the carrier (see FIG. 2) thence down the length of the left-hand portion of the carrier, exits at the left end of the carrier, and terminates in a free end portion 60 having the male part 62 of another miniature gold-plated connector silver soldered to its end.

The wiring loop is completed by a third wire 64 extending as a loop along the length of wiper blade 24, the wire being received in the longitudinally extending grooves 30, 32. The opposite ends of wire 64 at the left end of the wiper blade are silver soldered to female connector parts 66, 68 complementary to the male connector parts 50 and 62. Wire 64 is thus connected through the miniature connectors to the ends of wires 36 and 52. It will be appreciated that the provision of the connectors thus facilitates removal of the wiper blade, e.g. for replacement, without having to replace or re-wire the entire structure.

Electrical power to the resistance wiring may be supplied from a vehicle electrical system, for example, through an ignition switch terminal at the vehicle fuse block. A separate in-line fuse may be included between the fuse block and a manually operated control switch. From the control switch, conveniently mounted on the vehicle dashboard for example, a wire may be run through the vehicle fire wall to the vicinity of the wiper terminal where it is attached to connector 42. Wire 39 is of a length sufficient to accommodate rotational movements of the wiper structure and connector 42 allows for replacement of the entire structure.

Various modifications are possible within the scope of the invention. For example, wires 36 and 52 could extend to opposite ends of carrier 20 respectively, and wire 64 could have its ends at opposite ends of the wiper blade respectively for connection to wires 36 and 52 through male and female connector elements of the type previously described. This arrangement also allows disconnection and replacement of the wiper blade or replacement of the entire wiper structure.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A windshield wiper structure comprising a wiper arm having means at one end for attaching the arm to a wiper terminal of a vehicle, a wiper blade carrier on the other end of the wiper arm, a wiper blade carried by the blade carrier, and resistance wiring extending along the length of the wiper arm, through the blade carrier and along the length of the wiper blade, the wiring having a connector adjacent said one end of the wiper arm for connection into a vehicle electrical system, whereby electrical energy from said system may be supplied to the wiring to heat the wiper blade, the resistance wiring extending as a loop from said connector along the length of the wiper arm to a central part of the blade carrier, along the blade carrier to one end thereof, back along the length of the blade carrier to the other end thereof, to one end of the blade, along the length of the blade to the other end thereof, back along the length of the blade to said one end of the blade, back to said other end of the blade carrier, back to said central part of the blade carrier, and back along the wiper arm to the other end of the loop formed as a ground connection, and wherein the loop includes wiring connectors at said one end of the blade for providing detachment and replacement of the blade.

2. The invention of claim 1 wherein said other end of the wiring loop is secured to the wiper arm to provide the ground connection.

3. A windshield wiper structure comprising a wiper arm having means at one end for attaching the arm to a wiper terminal of a vehicle, a wiper blade carrier on the other end of the wiper arm, a wiper blade carried by the blade carrier, and resistance wiring extending along the length of the wiper arm, through the blade carrier and along the length of the wiper blade, the wiring having a connector adjacent said one end of the wiper arm for connection into a vehicle electrical system, whereby electrical energy from said system may be supplied to the wiring to heat the wiper blade, wherein the wiring comprises a first wire extending along the length of the wiper arm to a central part of the blade carrier and along the blade carrier to a first end thereof, a second wire extending along the length of the wiper arm to the central part of the blade carrier, along the blade carrier to the opposite end thereof and back along the blade carrier to said first end, a third wire extending from a first end of the wiper blade adjacent the first end of the carrier along the length of the blade and back to the first end thereof, and detachable connector elements between the respective ends of the third wire and the first and second wires at said first ends of the blade carrier and wiper blade permitting blade replacement, one of the first and second wires being provided with said connector and the other of the first and second wires providing a ground connection with the wiper arm.

4. The invention of claim 3 wherein the third wire is looped lengthwise around the wiper blade.

5. The invention of claim 4 wherein the third wire is located in lengthwise grooves on opposite sides of the wiper blade.

6. The invention of claim 3 wherein the connector elements comprise male and female connector parts at the ends of the respective wires.

* * * * *